US009262636B2

(12) United States Patent
Denis

(10) Patent No.: US 9,262,636 B2
(45) Date of Patent: Feb. 16, 2016

(54) METHOD FOR NEUTRALIZING PC BLOCKING MALWARE USING A SEPARATE DEVICE FOR AN ANTIMALWARE PROCEDURE ACTIVATED BY USER

(71) Applicant: NANO Security Ltd, Bryansk (RU)

(72) Inventor: Bogdanov Denis, Bryansk (RU)

(73) Assignee: NANO Security Ltd., Bryansk (RU)

( * ) Notice: Subject to any disclaimer, the term of this patent is extended or adjusted under 35 U.S.C. 154(b) by 0 days.

(21) Appl. No.: 14/261,016

(22) Filed: Apr. 24, 2014

(65) Prior Publication Data

US 2014/0325654 A1 Oct. 30, 2014

(30) Foreign Application Priority Data

Apr. 24, 2013 (RU) .................................. 2013118811

(51) Int. Cl.
*G06F 12/16* (2006.01)
*G06F 21/56* (2013.01)
*G06F 11/00* (2006.01)
(Continued)

(52) U.S. Cl.
CPC ............ *G06F 21/567* (2013.01); *G06F 21/568* (2013.01)

(58) Field of Classification Search
None
See application file for complete search history.

(56) References Cited

U.S. PATENT DOCUMENTS 6,108,799 A * 8/2000 Boulay et al. .............. 714/38.13
7,870,612 B2 * 1/2011 Liu ................................. 726/24

(Continued)

FOREIGN PATENT DOCUMENTS

EP 2797021 A1 10/2014
RU 91205 U1 1/2010
(Continued)

OTHER PUBLICATIONS

Office Action in Russian Application No. 2013-118811.
(Continued)

*Primary Examiner* — Shin-Hon Chen
(74) *Attorney, Agent, or Firm* — Saliwanchik, Lloyd & Eisenschenk

(57) ABSTRACT

The invention relates to the field of anti-virus protection. The technical result of the invention lies in providing possibility for unblocking the computer with no data loss and computer resetting, for increasing the antivirus systems operation efficiency and consequently improving the computer systems security. A method for neutralizing malicious software blocking computer operation, the method being performed by means of a separate antivirus activation device developed for the antimalware procedure activation to be run by a PC user, the device comprising connectors for connection to a control bus, a controller and an activation unit. Computer unblocking and malware neutralizing procedure is activated after receiving an activation signal from the antivirus activation device. Whereby said unblocking and malware neutralizing procedure includes: examining OS graphics subsystem state, searching for all the created windows and desktops viewed by the user; analyzing all the processes and flows executed with the PC at the time of infection; creating bindings on the collected data basis for each said window and desktop to a particular process and/or process hierarchy; analyzing the obtained data on the processes and identifying in each of them loaded modules involved in the process running; searching for the software automatically run in the course of OS start-up; compiling a list of the objects considered as malicious; isolating each malicious object, deleting its links out of OS configuration files, and aborting the malicious process produced by the object.

6 Claims, 2 Drawing Sheets

(51) Int. Cl.
*G06F 12/14* (2006.01)
*G08B 23/00* (2006.01)

(56) References Cited

U.S. PATENT DOCUMENTS

| | | | |
|---|---|---|---|
| 8,146,162 B1* | 3/2012 | Batenin | 726/24 |
| 9,021,453 B1* | 4/2015 | Zhang | 717/135 |
| 2008/0129577 A1* | 6/2008 | Pan | 341/175 |
| 2009/0055896 A1* | 2/2009 | Aoki et al. | 726/3 |
| 2009/0113128 A1* | 4/2009 | Zhao | 711/115 |
| 2011/0283358 A1* | 11/2011 | Cochin et al. | 726/23 |
| 2012/0260342 A1* | 10/2012 | Dube et al. | 726/24 |
| 2013/0067576 A1* | 3/2013 | Niemela | 726/24 |
| 2013/0167254 A1* | 6/2013 | Gyllenskog | 726/30 |
| 2014/0181971 A1* | 6/2014 | Tatarinov et al. | 726/23 |

FOREIGN PATENT DOCUMENTS

| | | |
|---|---|---|
| RU | 2430411 C1 | 9/2011 |
| RU | 2454714 C1 | 6/2012 |
| RU | 2527738 C1 | 9/2014 |

OTHER PUBLICATIONS

Michael Hale Ligh: "Volatility Labs: MoVP 1.3 Desktops, Heaps, and Ransomeware", retrieved from the Internet: URL: http://volatility-labs.blogpost.de/2012/09/movp-13-desktops-heaps-ransomeware.html, Sep. 12, 2012, XP055125320. Relevant to paragraph [ACCDFISARansomware].

European Search Report in counterpart European Application No. EP14165432.7.

* cited by examiner

METHOD FOR NEUTRALIZING PC BLOCKING MALWARE USING A SEPARATE DEVICE FOR AN ANTIMALWARE PROCEDURE ACTIVATED BY USER

CROSS-REFERENCE TO RELATED APPLICATION

This application claims the benefit under 35 U.S.C. §119 of Russian Application No. 2013118811, filed Apr. 24, 2013, which is hereby incorporated by reference in its entirety.

FIELD OF THE INVENTION

The invention relates to the field of anti-virus protection, and more particularly, to a method for neutralizing certain types of malicious software (SW).

BACKGROUND OF THE INVENTION

Presently existing systems of protection against malicious software allow for detecting it in the two ways:
  by the characteristic data previously obtained from the malicious files content (signatures, patterns, checksums, etc.);
  by the malware behaviour (heuristic and behavioural analyzers).

These methods are classic and effective against known types of malicious software. Yet, unfortunately, these methods are often powerless against new, recent malicious SW. The first reason for this is that their characteristic data (signatures, checksums) have not been entered yet into the virus database of an antivirus. The second reason lies in that heuristic and behavioural analyzers do not detect any danger, as the malware has been intentionally developed by hackers with its behaviour changed in order not to arouse the antivirus behavioural analyzer's suspicions. Whereby this malware being still unfamiliar to antiviruses often demonstrates itself revealing its presence to the user operating the infected computer at that moment. Ransomware may provide an example of such behaviour blocking computer operation and setting up, for example through display messages, their criminal claims to be executed by the user (usually concerning payments to be made in one way or another). Thus, it is obvious to a user that his/her computer is malware infected (as a malicious program requires certain actions to be performed by him/her), the computer is blocked, not allowing the user to work properly or even start procedures against the malicious program. Furthermore, the antivirus system does not detect and neutralize the infection, as it does not define any new threat, neither by the typical signs nor by the behaviour.

BRIEF SUMMARY

The object of the present invention is to provide an active infection neutralizing procedure run performed directly by a PC user, who has detected the infection, and performed through interaction with antivirus complex (AC) operating with the infected system by means of an external activation device connectable to the computer. Furthermore, this procedure analyzes the current state (for the active infection) of the operating system internal data and selects a particular method against "active" malicious SW. The term «active malicious software» is hereinafter specified as malware, run with an infected PC, operating therewith at given particular moment, and revealing its presence in one way or another.

Thus, the use of the method suggested allows solving the above-mentioned problem concerning conventional antivirus systems when the antivirus systems do not detect and neutralize infection, as they do not define any new threat, neither by the typical signs nor by the behaviour. This is achieved by the fact that a user is provided with the opportunity to report the antivirus software on the infection with the blocked computer and to activate in advance search and malware neutralizing procedures, applicable for the active infection stage only. Whereby the method is characterized in that:
  Using a separate peripheral device allows activating neutralizing procedures in the cases when a malicious program has disabled or limited the use of conventional PC input facilities, such as a keyboard and a mouse (this is an example of ransomware typical behaviour);
  Performing malware neutralizing and subsequent unblocking procedure achieved without resetting a computer and losing unsaved current user data as a result;
  Detecting and deleting or disabling the malicious software not present in the virus database of an antivirus before, performed due to the very fact of infection being detected personally by a user after his/her activating the neutralizing procedure, and further automatically analysing the operating system current state at the time of infection;
  Detecting the malicious SW not identified with behavioural analyzers by its behaviour as one of the main criteria for appraising the severity of a particular program is presented not just by the software formal behaviour but also by the fact of user's signal receipt (through the activation device being used) and the SW characteristics (temporal and situational);
  Simplifying the interaction between AC and the user, wherein for activating the malware neutralizing procedure the user is just to insert the device and press the button on it, with no extra actions, requiring high qualification in the field of computer security.

The technical result of the invention as claimed lies in providing possibility for unblocking a computer with no data loss and resetting, increasing antivirus systems operation efficiency and consequently improving computer systems security.

According to the present invention it is implemented a method for neutralization of malicious software blocking computer operation, the method being performed by means of a separate antivirus activation device developed for the antimalware procedure activation to be run by PC user, the device comprising connectors for connection to a control bus, a controller providing the device operation hardware and software logical circuitry and communication via the bus, and an activation unit. The method as above includes:
  1. Connecting the antivirus activation device to a computer.
  2. Transmitting an activation signal from the activation unit.
  3. Activating computer unblocking and malware neutralizing procedure by means of the activation device.

Whereby said unblocking and malware neutralizing procedure includes: examining OS graphics subsystem state, searching for all the created windows and desktops viewed by the user; analyzing all the processes and flows executed with the PC at the time of infection; creating bindings on the collected data basis for each said window and desktop to a particular process and/or process hierarchy; analyzing the data on the processes and identifying in each of them loaded modules involved in the process running; searching for the software automatically run in the course of OS start-up; compiling a list of the objects considered as malicious; isolating each malicious object, deleting its links out of OS configuration files, and aborting the malicious process produced by the object.

DETAILED DESCRIPTION

To solve the above and related problems, certain illustrative aspects are described herein in connection with the following description and the annexed drawings. However, these aspects provide just few possible approaches for using the principles disclosed herein and are intended to include all the similar aspects and their equivalents. Other advantages and characteristics result from the following detailed description provided in conjunction with the drawings.

In the following description, for explanation purposes, numerous specific details are set forth to provide a thorough understanding of the invention. However, it is obvious that some novel embodiments can be implemented without these specific details. Otherwise, conventional procedures, structures and devices are shown by means of flow-charts in order to facilitate their description.

DESCRIPTION OF THE ACTIVATION DEVICE

Figure 1:
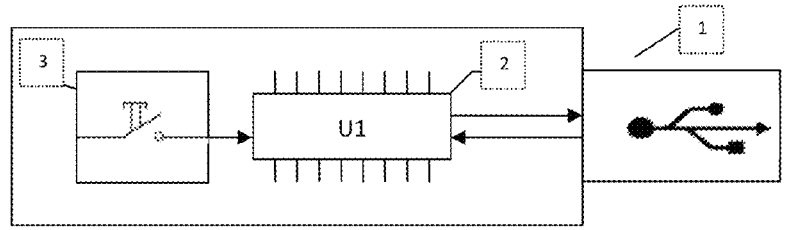
FIG. 1 presents a schematic example of an antivirus activation device conception embodiment.

The antivirus activation device (FIG. 1), which serves to activate the malware neutralizing procedure, can be connected to a computer via standard communication buses used in PC, such as USB, COM, LPT, (s)ATA, FireWire, etc. Thus the device has connectors 1 for connection to a particular control bus, a controller 2 providing the device operation hardware and software logical circuitry and communication via the bus, and an activation unit 3, which may be configured as a button, a sensor or a switch. Note that in this text only one of the schematic embodiments of such a device is described, whereby the technical implementation of the rest may substantially differ.

Figure 2:
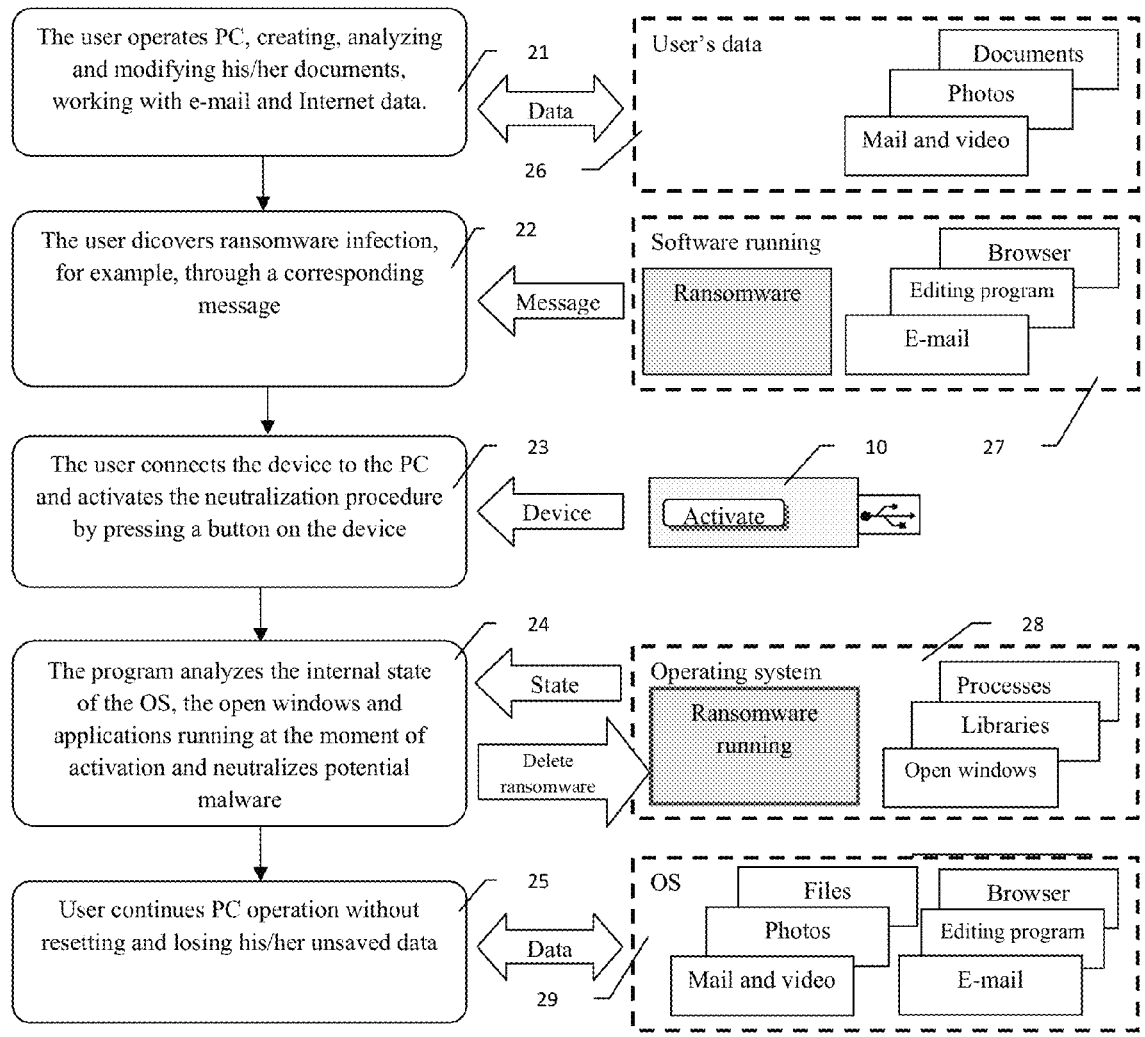
FIG. 2 presents basic stages for neutralizing a piece of malware in terms of ransomware.

The basic stages for neutralizing a piece of malware are further given in terms of ransomware (FIG. 2).

1. Through data inputting and creating new files (26) while operating PC (21) a user expose his/her PC to infection (22) with ransomware, demanding from him/her a certain amount to be paid or any other actions to be performed to continue operation. At that the malware disables or limits the keyboard and mouse operation, thus disabling the user to delete the malware with any previously set PC facilities, to continue operation or even to save the data having been input.

2. The user connects (23) the anti-virus activation device (10) to the PC. After connecting it via a standard communication bus connector, the following occurs:

a. The device 10 is recognized by the computer hardware (the bus controller, the low-level input-output system), and the currently loaded and running operating system 28 executed by the PC processor in the PC memory address space;

b. The current operating system 28, being run with the PC hardware sends a corresponding signal for the device 10 to load a management application (the device driver).

c. The management application (driver) sets the device 10 for the current operating system 28, in particular, making its hardware resources available for use.

3. The user presses the button (activates the switch) on the body of the device 10. This action activates the unblocking and malware neutralizing procedure, running on the PC processor and within its address space using the following sequence of events:

a. The controller of the device 10 receives a signal from the switch (button), and generates a sequence of commands with the communication bus;

b. The commands are received by the hardware of the PC, whose bus the device 10 is connected to (the bus controller and the input-output system participating in the processing), and are sent for processing to the current operating system 28 running with the processor of the PC and using its ram memory;

c. After receiving the data for processing the operative system 28, sends them to the corresponding driver of the device 10 previously loaded at stage 2.b.

d. The driver of the device receives the data on the switch activation from the operating system 28 and reports on this to the antivirus software running with the PC current operating system 28.

e. The antivirus software receives the activation signal and launches the computer unblocking and malware neutralizing procedure 24. Whereby such activation through an exterior device allows for activation to be performed without conventional input facilities, which are blocked by the malicious software.

After unblocking and malware neutralizing the user is informed on the procedure completion, whereafter the device 10 may be removed. At that further operation 25 may be continued with no data loss 29 and no harm caused by the ransomware.

Figure 3:
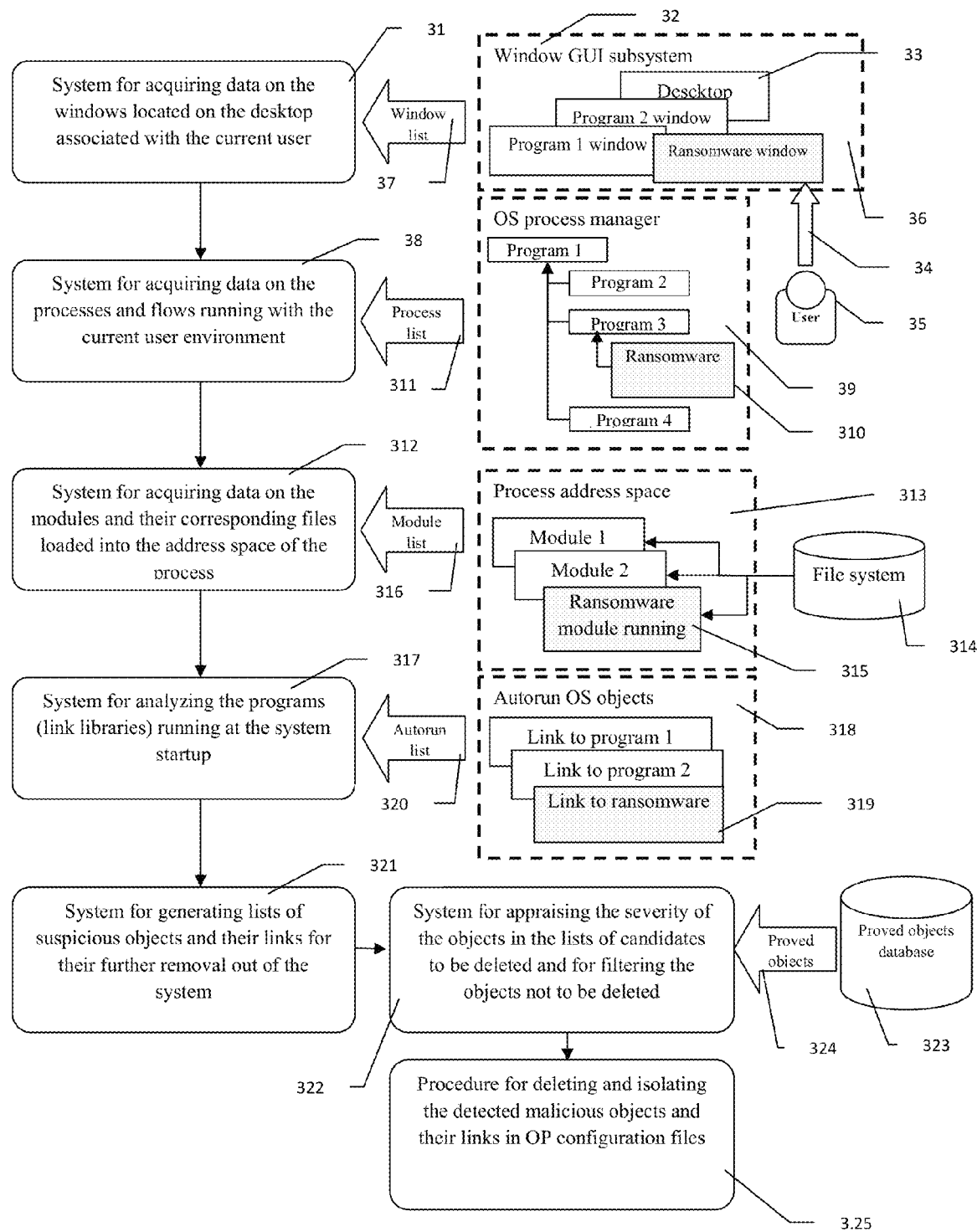
FIG. 3 presents a flow-chart for the unblocking and malware neutralizing procedure.

The following describes the algorithm of the PC unblocking and malware neutralizing procedure (FIG. 3).

The computer unblocking and malware neutralizing procedure launched by the antivirus software performs actions aimed at the renewal of the user's efficient operation with said PC, wherein the following is carried out:

a. A subsystem for tracking all the existing Graphical User Interface 31 windows at the time of the malware neutralizing procedure activation with the operating system examines the state of the operating system Texas Instruments Graphics Architecture 32, finds all the created windows and desktops 33 viewed by the user, as well as the procedures for the windows input-output processing, capturing 34 the user's current input-output 35, including their hidden files. Among these windows there are both regular software windows, and malicious software windows 36. The data are grouped together into lists 37 to be sent for the further processing.

b. An integrated into the antivirus software subsystem for monitoring 38 the browser 39 of OS processes, run by the currently used PC processor and ram memory, analyses all the processes and flows executed with the PC at the time of infection while creating the processes interrelation pattern. The malicious software process 310 is one of these processes. On the collected data basis a binding is created for each window, obtained at the previous stage for a particular process and/or process hierarchy 311.

c. A system for analyzing the loaded modules 312 analyzes the received data on the processes and identifies in each of them the modules loaded into its address space 313, participating in the process running. By means of the file control system browser 314 for each module it is determined a file storing its content. Among these modules it is detected the malicious software 315 module being currently run. The data concerning the modules are saved into the module lists with bindings to the corresponding processes and files 316.

d. Being a part of the antivirus complex a procedure for analyzing the objects automatically run in the course of OS start-up 317 performs searching for the software 318 automatically run in the course of OS start-up. Whereby a link is also detected associated with the malicious software 319 if present, and there are compiled the lists containing the description concerning the type of the link and its location within OS configuration files 320.

e. Using the data collected at stages a, b, c, d a procedure for analyzing the collected information 321, performs the current state analyses based on the integrated algorithm, creates lists of the objects being suspicious and malicious object candidates. The lists are sent to severity appraisal system 322, which forms the final lists of the objects considered as malicious on the basis of the suspicious object content and a supplementary data base for the proved objects 323. While supplementary data stored in the data base files both within the PC and the external activation device, may be used for malware neutralization.

f. The final lists of malicious objects are sent to a subsystem for object isolation and deleting 325, isolating properly the object, deleting its links out of OS configuration files, and aborting the malicious process produced by the object.

After activating the unblocking and malware neutralizing procedure the user is informed on the procedure completion, whereafter the activation device may be removed. At that further operation may be continued with no data loss and no harm caused by the ransomware.

A malware neutralizing procedure peculiarity is an ability to detect still unfamiliar malware, due to the use of complex information on the system state just at the moment of the malware activation. Whereby the user performs an important function of reporting on active infection (in this case acting as an expert), i.e. he/she functions as a procedure launching trigger for the state of emergency. After receiving the user's signal on infection said analyzing system allows detecting the precedent without its being preliminary examined and entered into the virus data base.

As used herein the terms "component" and "module" refers to computer entity that represents either hardware or hardware and software combination, or software, or currently-running software. For example, a module can be, but is not limited to, a process running on a processor, a processor, a hard disk drive, multiple drives (of optical and/or magnetic medium), an object, an executable module, an execution flow, a program, and/or a computer. By way of illustration, the module may be both an application running on a server and properly a server. One or more modules may be placed in the process and/or execution flow and a module may be located within one computer and/or distributed between two or more computers.

Although the description above relates generally to computer instructions that may run with one or more computers, those skilled in the art will appreciate that a new embodiment can also be implemented in conjunction with other program modules and/or as a combination of hardware and software.

Generally, program modules include procedures, programs, objects, components, data structures, etc. executing particular tasks or implementing particular abstract data types.

Moreover, those skilled in the art will appreciate that the methods of the invention may be implemented using other computer system configurations, including single-processor or multiprocessor computer systems, minicomputers, mainframe computers, as well as personal computers, handheld computing devices, microprocessor or programmable consumer electronic devices, etc., each of them being connectable to one or more respective devices in the course of operation.

A computer typically includes a variety of computer-readable media. The computer-readable media can be any available media accessed by the computer and include both volatile and non-volatile media, as well as both removable media and non-removable ones. By way of example and being not limited to, computer-readable media may comprise computer storage media and communication media. Computer storage media include volatile and non-volatile, removable and non-removable media implemented in any method or technology for storing information such as computer readable commands, data structures, program modules or other data. Computer storage media include, but are not limited to, RAM, ROM, EEPROM, flash memory or other memory technology, CD-ROM, digital versatile disks (DVD) or other optical disks, magnetic cassettes, magnetic tape, magnetic disk or other magnetic storage devices, or any other medium which can be used to store the desired information and which can be accessed by the computer.

An exemplary computer system for implementing various aspects includes a computer, wherein the computer includes a processor, a system memory, and a system bus. The system bus provides the interface for system components including, but not limited to, the processor system memory. The processor can be any of various commercially available processors. As a processor it is also possible to use double microprocessors and other multiprocessor architectures.

The system bus may be any of the bus structure types, and may further be connected to a memory bus (with or without a memory controller), a peripheral bus, and a local bus using any of the variety of commercially available bus architectures. The system memory includes a read-only memory (ROM) and a random access memory (RAM). The basic input/output system (BIOS) is stored in non-volatile memory, such as ROM, EPROM, EEPROM, wherein the BIOS contains the main procedures that help to transfer information between elements within the computer, for example in the course of start-up. RAM may also include a high-speed RAM such as static RAM for caching data.

The computer further includes an internal hard disk drive (HDD) (e.g., EIDE, SATA), wherein the internal hard disk drive may also be adapted for external use in a suitable chassis (not shown), a magnetic floppy disk drive (FDD), (e.g. for reading from or writing to a removable diskette), and an optical disk drive (for example, the reading CD-ROM, or a drive for reading from or writing to other high capacity optical media, for example, DVD). The hard disk drive, the magnetic disk drive and the optical disk drive can be connected to the system bus by a hard disk drive interface, a magnetic disk drive interface, and an optical drive interface, correspondingly. The interface for the external drive implementation includes at least one or both of Universal Serial Bus technology (USB) and IEEE 1394 interface.

The drives and their associated computer storage media provide non-volatile storage of data, data structures, computer commands, etc. For the computer the drives and media provide the storage of any data in a suitable digital format. Although the foregoing description of computer-readable media refers to an HDD, a removable magnetic diskette, and removable optical media, e.g., CD or DVD, those skilled in the art will appreciate that other types of computer-readable media, for example, zip-disks, magnetic tapes, flash memory cards, cartridges, and the like, also can be used in the exemplary operating environment, and further that any such media may contain computer instructions for implementing the new methods of the architecture disclosed.

A number of software modules including an operating system, one or more application programs, other program modules and program data can be stored with the drives and RAM. An operating system, applications, modules and/or data can also be fully or partially cached with the RAM. It is also apparent that the disclosed architecture can be implemented with various commercially available operating systems or operating system combinations as well.

The user may enter commands and information into the computer via one or more wired/wireless input devices, e.g., a keyboard and a pointing device such as a mouse. The input/output devices may include a microphone/speakers or another device, for example, an IR remote control, a joystick, a game pad, a stylus, a touch screen, etc. These and other input devices are often connected to the processor via an input interface connected to the system bus, yet they may be equally connected through other interfaces, such as a parallel port, IEEE 1394 serial port, game port, USB, IR interface, etc.

A monitor or display device of another type is also connected to the system bus via an interface, such as a video adapter. In addition to the monitor, a computer typically includes other peripheral output devices such as speakers, printers, etc.

The described above represents examples of the disclosed architecture. Of course, it is not possible to describe all the combinations of components or methods conceivable, yet one skilled in the art may appreciate that many further combinations and permutations are possible. Accordingly, the new architecture is intended to involve all such alterations, modifications and variations that fall within the spirit and scope of the claims. Furthermore, to the extent that the term "includes" is used in either the detailed description or in the claims, such term is intended to be inclusive similar to the term "comprising" as "comprising" is interpreted when used as a transitional word in a claim.

The invention claimed is:

1. A method for neutralizing a software-blocking computer operation performed by ransomware, the method comprising:
    connecting a separate antivirus activation device to a computer, wherein the device comprises connectors for connection to a control bus, a controller providing the device operation hardware and software logical circuitry and communicating via the control bus, and an activation unit;
    receiving, at the activation unit of the separate antivirus activation device, an indication to neutralize the ransomware, wherein the indication is not initiated via an input device of the computer;
    transmitting, from the activation unit of the separate antivirus activation device, an activation signal for an antivirus software stored on the computer; and
    activating, without resetting the computer and without losing unsaved current user data, a computer unblocking and malware neutralizing procedure,
    wherein said computer unblocking and malware neutralizing procedure comprises:
        examining OS graphics subsystem state, searching for all the created windows and desktops viewed by the user;
        analyzing all the processes and flows executed with the PC at the time of infection;
        creating bindings on the collected data basis for each said window and desktop to a particular process and/or process hierarchy;
        analyzing the obtained data on the processes and identifying in each of them loaded modules involved in process running;
        searching for the software automatically run in the course of OS start-up;
        compiling a list of the objects considered as malicious;
        isolating each malicious object, deleting its links out of OS configuration files, and aborting the malicious process produced by the object.

2. The method of claim 1, characterized in that, the separate antivirus activation device is connected to a computer via standard communication buses used in PC selected from USB, COM, LPT, (s)ATA, and FireWire.

3. The method of claim 1, characterized in that, the activation unit is configured as a button, a sensor or a switch.

4. The method of claim 1, characterized in that, the method further includes following stages of:
    recognizing the activation device by the computer hardware and the currently loaded and running operating system;
    sending a corresponding signal for the antivirus activation device to load a management application.

5. The method of claim 1, characterized in that, the antivirus activation device driver receives the data on the activation unit being enabled, wherein the antivirus activation device driver reports on said activation to the antivirus software running with the PC current operating system.

6. The method of claim 1, characterized in that, said list of the objects considered as malicious is compiled on the basis of the suspicious object content and a supplementary data base for the proved objects.

* * * * *